United States Patent
Sullivan et al.

(10) Patent No.: US 11,027,482 B2
(45) Date of Patent: Jun. 8, 2021

(54) ADDITIVE MANUFACTURING OF MULTI-COMPONENT PARTS FOR CUSTOMIZABLE ENERGETIC SYSTEMS

(71) Applicant: LAWRENCE LIVERMORE NATIONAL SECURITY, LLC, Livermore, CA (US)

(72) Inventors: Kyle T. Sullivan, Pleasanton, CA (US); Alexander E. Gash, Brentwood, CA (US); Robert V. Reeves, Livermore, CA (US); John Vericella, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 371 days.

(21) Appl. No.: 15/019,524

(22) Filed: Feb. 9, 2016

(65) Prior Publication Data
US 2017/0225389 A1 Aug. 10, 2017

(51) Int. Cl.
*B29C 64/106* (2017.01)
*B29C 64/165* (2017.01)
(Continued)

(52) U.S. Cl.
CPC .......... *B29C 64/106* (2017.08); *B29C 64/165* (2017.08); *B33Y 10/00* (2014.12);
(Continued)

(58) Field of Classification Search
CPC ................. B29C 48/16; B29C 64/106; B29C 2948/92571; B29C 48/05; B29C 48/92; B29C 48/02; B33Y 10/00; B33Y 30/00
See application file for complete search history.

(56) References Cited

U.S. PATENT DOCUMENTS 3,002,459 A * 10/1961 Harper ..................... C06B 45/12
102/287
3,022,735 A * 2/1962 Eberle ...................... C06B 45/12
102/288
(Continued)

OTHER PUBLICATIONS

Sullivan, Kyle T., Cheng Zhu, Eric B. Duoss, Alexander E. Gash, David B. Kolesky, Joshua D. Kuntz, Jennifer A. Lewis, and Christopher M. Spadaccini. 2016. "Controlling Material Reactivity Using Architecture." Advanced Materials No. 10: 1934. Academic OneFile, EBSCOhost (accessed Feb. 27, 2018). (Year: 2016).*
(Continued)

*Primary Examiner* — Joseph S Del Sole
*Assistant Examiner* — Manley L Cummins, IV
(74) *Attorney, Agent, or Firm* — Eddie E. Scott

(57) ABSTRACT

An apparatus, system, and method utilizes at least two separate components during the process of producing the final product. At least one component during the process is produced using additive manufacturing, and additional components are components that are combined with the additively manufactured part. The apparatus, system, and method includes at least one energetic component and at least one second inert component. An additive manufacturing system produces a scaffold of said first energetic component(s). A system adds the second component(s) to the scaffold to produce the energetic material product.

1 Claim, 6 Drawing Sheets

(51) Int. Cl.
*C06B 21/00* (2006.01)
*B33Y 10/00* (2015.01)
*B33Y 30/00* (2015.01)
*B29C 48/16* (2019.01)
*B29L 31/30* (2006.01)
*B29C 48/02* (2019.01)
*B29C 48/05* (2019.01)
*B29C 48/92* (2019.01)

(52) U.S. Cl.
CPC .......... *B33Y 30/00* (2014.12); *C06B 21/0075* (2013.01); *B29C 48/02* (2019.02); *B29C 48/05* (2019.02); *B29C 48/16* (2019.02); *B29C 48/92* (2019.02); *B29C 2948/92571* (2019.02); *B29L 2031/3097* (2013.01)

(56) References Cited

U.S. PATENT DOCUMENTS

| | | | | |
|---|---|---|---|---|
| 3,120,737 A * | 2/1964 | Holloway | ................ | F02K 9/12 60/250 |
| 3,226,928 A * | 1/1966 | Jackson | ................ | F02K 9/16 60/253 |
| 3,316,718 A * | 5/1967 | Webb | ................ | F02K 9/16 60/255 |
| 3,348,445 A * | 10/1967 | Nadel | ................ | F42B 5/16 86/1.1 |
| 3,646,597 A * | 2/1972 | Feemster | ................ | F02K 9/18 60/251 |
| 3,918,365 A * | 11/1975 | Arribat | ................ | F02K 9/12 102/287 |
| 5,997,795 A * | 12/1999 | Danforth | ................ | B29C 33/3842 264/401 |
| 7,093,542 B2 | 8/2006 | Gousman et al. | | |
| 9,038,368 B2 | 5/2015 | Fuller | | |
| 9,453,479 B1 * | 9/2016 | Jones | ................ | F02K 9/08 |
| 2002/0157557 A1 * | 10/2002 | Cesaroni | ................ | C06B 45/00 102/291 |
| 2004/0244890 A1 * | 12/2004 | Cesaroni | ................ | C06B 45/00 149/3 |
| 2012/0060468 A1 | 3/2012 | Dushku et al. | | |
| 2013/0042596 A1 * | 2/2013 | Fuller | ................ | B29C 67/0055 60/255 |
| 2013/0108726 A1 | 5/2013 | Uckelmann et al. | | |
| 2015/0054204 A1 | 2/2015 | Tseliakhovich et al. | | |
| 2015/0093465 A1 | 4/2015 | Page | | |
| 2015/0157822 A1 * | 6/2015 | Karpas | ................ | B29C 33/52 128/206.24 |
| 2015/0165690 A1 | 6/2015 | Tow | | |
| 2015/0183164 A1 | 7/2015 | Duty et al. | | |
| 2016/0052016 A1 * | 2/2016 | Te | ................ | B05D 3/002 427/290 |
| 2016/0355447 A1 * | 12/2016 | Danforth | ................ | F02K 9/12 |
| 2017/0121039 A1 * | 5/2017 | Ciesiun | ................ | B33Y 10/00 |
| 2017/0226026 A1 * | 8/2017 | Jones | ................ | C06B 45/14 |
| 2017/0246800 A1 * | 8/2017 | Husband | ................ | B29C 64/106 |
| 2017/0278586 A1 * | 9/2017 | van Staden | ................ | G21C 3/28 |
| 2018/0156158 A1 * | 6/2018 | Lynch | ................ | F02K 9/12 |

OTHER PUBLICATIONS

Mezger, Mark J., Kay J. Tindle, Michelle Pantoya, Lori J. Graven, and Dilhan M. Kalyon. 2017. Energetic Materials : Advanced Processing Technologies for Next-Generation Materials: Chapter 7 pp. 115-127. Boca Raton, FL: CRC Press, 2017. eBook Index, EBSCOhost(accessed Feb. 27, 2018). (Year: 2017).*

Parimi, V.S., S.A. Tadigadapa, and R.A. Yetter. "Control of nanoenergetics through organized microstructures." Journal of Micromechanics and Microengineering, 2012., 055011, British Library Document Supply Centre Inside Serials & Conference Proceedings, EBSCOhost (accessed Feb. 27, 2018). (Year: 2012).*

Electrophoretic Deposition of Thermites onto Micro-Engineered Electrodes Prepared by Direct-Ink WritingK. T. Sullivan, C. Zhu, D. J. Tanaka, J. D. Kuntz, E. B. Duoss, and A. E. GashThe Journal of Physical Chemistry B 2013 117 (6), 1686-1693DOI: 10.1021/jp306440t (accessed Feb. 27, 2018) (Year: 2012).*

Sullivan, Kyle Thomas, Marcus Andre Worsley, Joshua David Kuntz, and Alex Eydmann Gash. 2012. "Electrophoretic deposition of binary energetic composites." Combustion and Flame 159, 2210-2218. ScienceDirect, EBSCOhost (accessed Feb. 27, 2018). (Year: 2012).*

Tappan, Alexander S, Ball, James Patrick, and Colovos, James W. Inkjet Printing of Energetic Materials: Sub-Micron Al/MoO3 and Al/Bi2O3 Thermite.. United States: N. p., 2012. Web <https://www.osti.gov/biblio/1294186>. (accessed Feb. 27, 2018) (Year: 2012).*

BASIRICO.Futurism: Scientific Inaccuracies in 'Star Wars.' Retrieved online on May 10, 2020. <https://vocal.media/futurism/scientific-inaccuracies-in-star-wars> (Year: 2017).*

Rocketology: NASA's Space Launch System. "We've Got (Rocket) Chemistry, Part 1" Retrieved online on May 10, 2020. https://blogs.nasa.gov/Rocketology/tag/liquid-oxygen/ (Year: 2020).*

Simpson et al., "Transforming Explosive Art into Science," S&TR, https://str.llnl.gov/str/Simpson.html, 1997, 17 pages.

Sullivan et al., "Directed Assembly of Energetic Materials with Micro-Engineered Architectures," LLNL Poster—516073, 2011, 1 page.

Sullivan et al., "Thermite Research Heats Up," S&TR, 2015, 4 pages.

International Search Report for PCT/US17/016705, corresponding to U.S. Appl. No. 15/019,524, 11 pages.

* cited by examiner

ADDITIVE MANUFACTURING OF MULTI-COMPONENT PARTS FOR CUSTOMIZABLE ENERGETIC SYSTEMS

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to additive manufacturing of multi-component parts for customizable energetic Systems.

State of Technology

This section provides background information related to the present disclosure which is not necessarily prior art.

The fine spatial control of material placement now possible with additive manufacturing (AM), or 3D printing, is enabling for both processing and controlling the properties and performance of energetic materials. Energetic materials, or simply energetics, are monomolecular materials or composite formulations which can exothermically react through chemical reactions. Some examples of energetic materials are propellants, explosives, pyrotechnics, and reactive formulations such as intermetallic mixtures and thermite composites.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors' apparatus, systems, and methods utilize additive manufacturing, also known as 3D printing, in at least one step to produce a multi-material energetic system. In one embodiment of the inventors' apparatus, systems, and methods a scaffold part is additively manufactured, or may be produced by another method. A second step, which may be additive manufacturing or another method, is used to add a different material to the part. The scaffold may be left within the part, or removed during processing. Any number of subsequent additive manufacturing, casting, and removal steps may be performed until the final part is produced. The relative spatial placement of the two, or more, materials which gives rise to controlling the properties and/or performance of the energetic part.

Additive manufacturing may be used for other considerations, such as cost reduction, or producing difficult or impossible geometries which may not be accessible using other manufacturing techniques. The inventors' apparatus, systems, and methods provide a customized energetic system. The apparatus, systems, and methods utilize at least two separate components during the process of producing the final product. At least one component during the process is produced using additive manufacturing, and additional components are components that are combined with the additively manufactured part. Air is considered a component in this case as well, so long as the placement of the air is necessary for controlling the properties and/or performance of the energetic part. An example would be a part with controlled porosity.

In one embodiment the inventors' apparatus, systems, and methods combine additive manufacturing (AM) with an infill step to render a system which is energetic. A material, which is different from that used in the AM step, is then subsequently added to the structure via a second technique (i.e. casting, deposition, additive manufacturing etc.) The result is a final energetic part comprising at least two components.

In one embodiment the inventors' apparatus, systems, and methods produces an energetic material product. The energetic product includes at least one energetic component and at least one second energetic component. The inventors' apparatus, systems, and methods utilize an additive manufacturing system for producing a scaffold of said first energetic component. A system adds the second energetic component to the scaffold to produce the energetic material product.

In one embodiment the inventors' apparatus, systems, and methods produces an energetic material product. The energetic material product includes at least one energetic component and at least one second inert component. The inventors' apparatus, systems, and methods utilize an additive manufacturing system for producing a scaffold of said first energetic component(s). A system adds the inert component(s) to the scaffold to produce the energetic material product.

In one embodiment the inventors' apparatus, systems, and methods produces an energetic material product. The energetic material product includes at least one inert component and at least one second energetic component. The inventors' apparatus, systems, and methods utilize an additive manufacturing system for producing a scaffold of said first inert component(s). A system adds the energetic component(s) to the scaffold to produce the energetic material product.

In one embodiment the inventors' apparatus, systems, and methods produces an energetic material product. The energetic material product includes at least one constituent of a reactive formulation and at least one second constituent of a reactive formulation component. The inventors' apparatus, systems, and methods utilize an additive manufacturing system for producing a scaffold of said first constituent(s). A system adds the second constituents(s) to the scaffold to produce the energetic material product. An example would be a reactive composite (i.e. thermite, intermetallic, pyrotechnic, propellant) where the constituents (i.e. the fuel and oxidizer) are added in separate stages.

There are a number of advantages with the inventors' apparatus, systems, and methods. First, they allow the strategic placement of one material (energetic, or not) into the final assembly. Second, by intentionally leaving out one component of the energetic system until desired, the part may be made safer to handle or secure from insult. Once the final material is infilled into the part, it behaves as intended.

A third advantage is the ability is to use AM to print custom molds for energetic material, which are then filled with a cast-able energetic material.

The inventors' apparatus, systems, and methods have many uses. For example, the inventors' apparatus, systems, and methods have use in safe shipping of materials made by AM which, upon arrival, are made energetic after the infill step. The inventors' apparatus, systems, and methods also have use in solid rocket propellants. The inventors' apparatus, systems, and methods have many other uses.

The apparatus systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
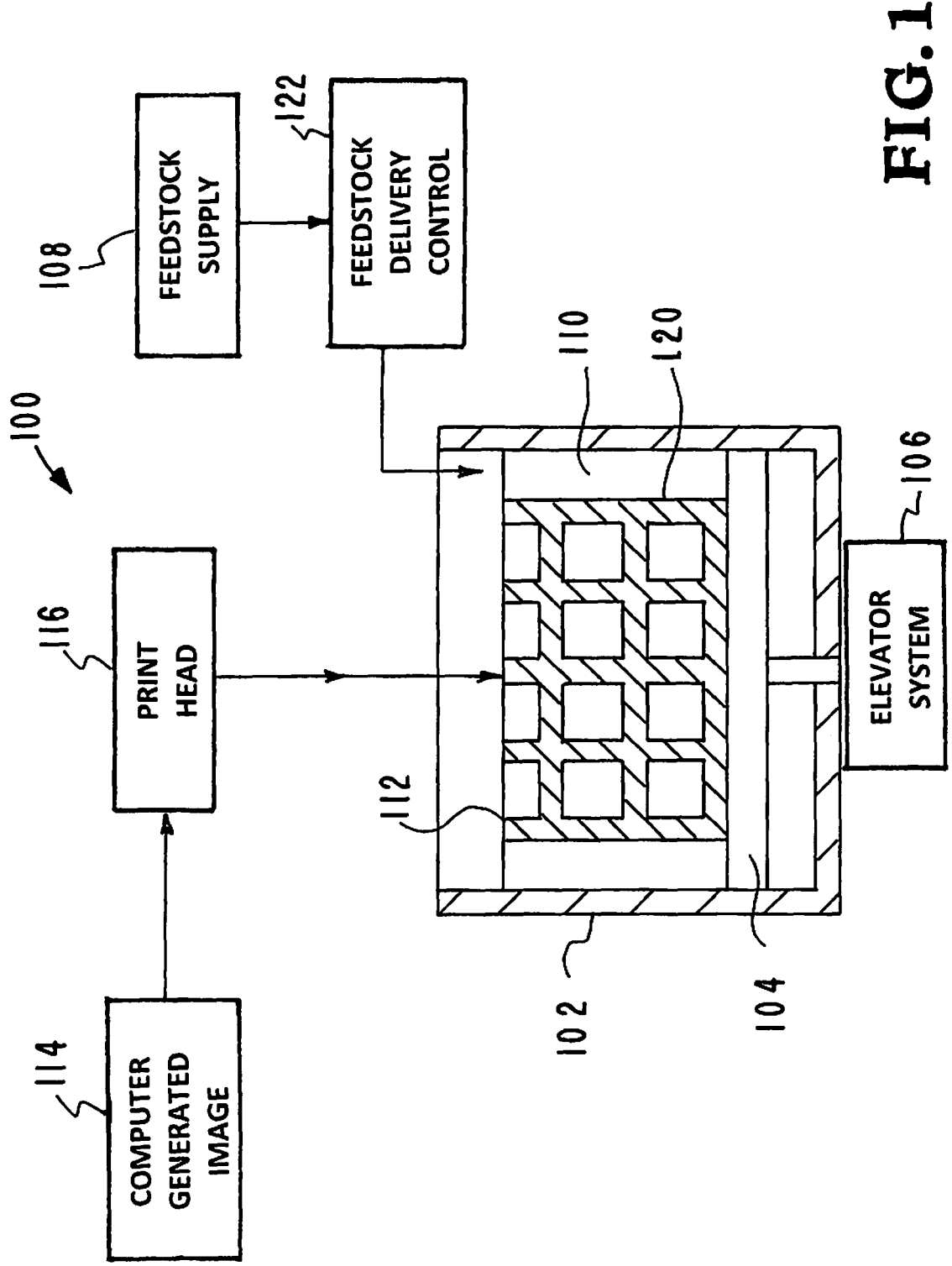
FIG. 1 is an illustrative depiction of one embodiment of an additive manufacturing system for creating a part made of an energetic material.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

In various embodiments, the inventor's apparatus, systems, and methods additive manufacturing, or 3D printing, is used in at least one step of a process to produce a multi-material energetic part. Various architected 3D objects are printed onto arbitrary substrates, and the same or an alternate method can then be used to deposit or fill a second material or component into/onto the structure. The order of operations is interchangeable, as necessary, so long as one step utilized an additive manufacturing method and so long as the final part is energetic. This technique is applicable to a wide range of energetic applications, and also allows for unique mechanistic investigations of energetic materials, due to the precision placement and design of unique architectures. Furthermore, this scalable combination of capabilities will allow for bottom-up assembly of energetic systems with the performance being related to the relative placement of materials.

Referring now to the drawings and in particular to FIG. 1, one embodiment of the inventor's apparatus, systems, and methods is illustrated. The embodiment is designated generally by the reference numeral 100. FIG. 1 is a view showing the structural components and illustrating the operation of the embodiment 100. The components of the embodiment 100 include those identified and described below.

Container 102.
Build platform 104 (Substrate).
Elevator system 106.
Feedstock supply (Powder or liquid) 108.
Excess support material not printed 110.
Current print layer 112.
Computer generated pattern to be printed 114.
Print head (light or binder fluid) 116.
Object under construction (Scaffold) 120.
Feedstock delivery control 122.

In the embodiment 100 additive manufacturing is used in at least one step of a process to produce a multi-material energetic part. The embodiment 100 provides an additive manufacturing system for selectively processing a feedstock material layer-by-layer to produce a part. Processing can include, but is not limited to, using a computer 114 to control the motion of a print head 116 to deliver a pattern of light or pattern of fluid to the layer being printed. In other variations, the print head is fixed and the part is moved relative to the print head. The processing of a layer can include, but is not limited to, melting, sintering, curing, polymerizing, chemically treating, or binding the feed material, and this is considered the printing step. The layer can be processed all at once, or in a rastering step, and the printing of the layer is completed before moving to the next layer. The layer thickness is controlled by the process, and can vary. Unprocessed material 110 is contained 102 and remains in the build area during the printing, and acts as a support material for the printed part 120.

Initially a 3D model of the desired product is designed by any suitable method, e.g., by bit mapping or by computer aided design (CAD) software at a PC/controller. The CAD model of the desired product is electronically sliced into series of 2-dimensional data files, i.e. 2D layers, each defining a planar cross section through the model of the desired product. The sliced layer thickness can vary depending on the spatial resolution of layer printing. The 2-dimensional data files are stored in a computer and provide a digital image of the final product.

The digital images are used in the additive manufacturing system 100 to produce the final product. At least two layers of the feedstock (powder or liquid) is printed sequentially onto a substrate according to the images in a layer by layer process to produce the final product. The digital image of the first 2D layer is used to produce the layer of the desired product. The print process and motion control are controlled by at least one computer such that the pattern is processed for that layer.

A delivery system directs a first layer of feedstock from the feedstock supply 108 onto the build platform 104. The first layer may be thinner or thicker than the print layer, depending on the process, and is often thicker to prevent adhesion to the build platform. The system 100 utilizes light energy or a fluid, delivered from the print head 116 that is delivered to the first layer of powder 112 on the substrate 104. The digital image of the first 2D layer that has been stored in computer is used to produce this print layer. Additional layers are added sequentially onto the first layer, by either lowering the elevator system 106 or by raising the print head 116, depending on the process. In one embodiment of the system 100, a light valve system (Optically addressed light valve (OALV)) is utilized, and is situated between a diode array light source (the print head in this case) 116 and the build layer 112. The OALV generates a masking area that is transparent to the laser diode beam and blocking the area of the mask not transparent to the laser diode beam. Details of an exemplary light valve system are provided in U.S. Published Patent Applications No. 2014/0252687 for system and method for high power diode based additive manufacturing. The disclosure of U.S. Published Patent Application No. 2014/0252687 is incorporated herein by this reference.

The first layer of feedstock powder 108 is bonded to the substrate 104, or is started at some standoff distance above the substrate, by the printing step if it is not to be bonded to the substrate. The motion control of the print head 116, or the build platform is used in conjunction with the dispensing step controlling the print head 116 to deliver light or fluid to the layer in a pattern prescribed by the digital image of the first 2D layer. The print head processes the powder according to the digital image of the first 2D layer information producing the finished first layer.

Once the first layer is completed production of the second layer of the product is started. A second layer of powder is applied on top of the completed first layer. The elevator system 106 and delivery of new feedstock are used to apply a second layer of feedstock 112. The second layer of powder is printed on top of the first layer of the product by using the print head and motion control to process the second layer, according to the digital image of the second 2D layer information producing the finished second layer. This procedure is continued by repeating this step any finite number of times, until the appropriate number of layers have been printed to produce the products. The final product is a scaffold 120 that will be described in greater detail in connection with FIGS. 4A through 4C.

Figure 2:
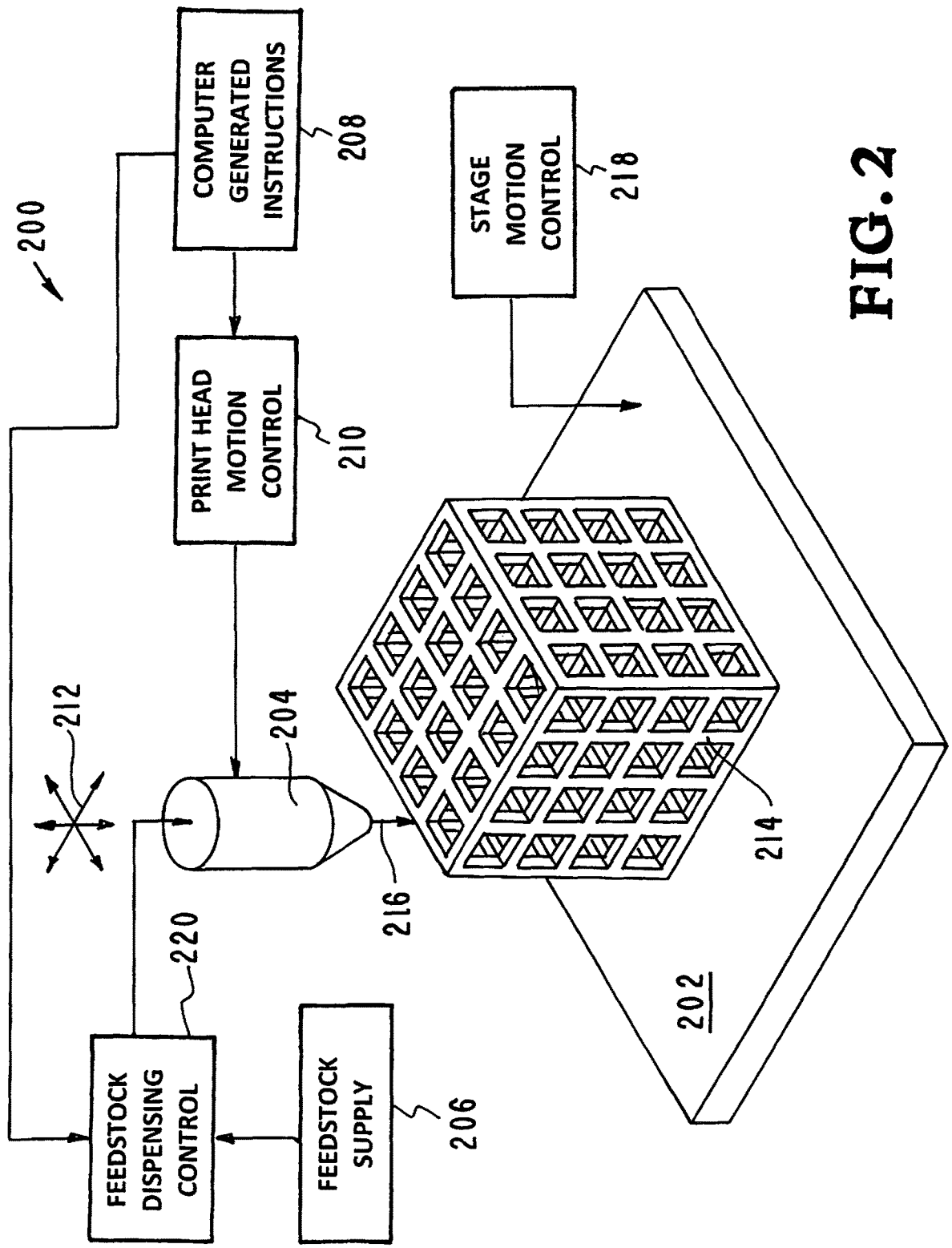
FIG. 2 is an illustrative depiction of another embodiment of an additive manufacturing system for creating a part made of an energetic material.

Referring now to FIG. 2, another embodiment of the inventor's apparatus, systems, and methods is illustrated. The embodiment is designated generally by the reference numeral 200. FIG. 2 is a view showing the structural components and illustrating the operation of the embodiment 200. The components of the embodiment 100 include those identified and described below.

Build platform 202 (Substrate).
Print head 204.
Feedstock supply 206.
Computer generated instructions 208.
Print head movement control 210.
Substrate movement control 218
Print head movement arrows 212.
Object under construction (Scaffold) 214.
Print stream 216.
Feedstock dispensing control 220.

In the embodiment 200 additive manufacturing is used in at least one step of a process to produce a multi-material energetic part. The embodiment 200 provides an additive manufacturing system for printing layers of material to produce a part. As illustrated in FIG. 2, extruded material in the form of a print stream 216 is deposited in a layer-by-layer process onto the substrate 202 by print head 204 to produce the object under construction 214. Motion control for a layer includes moving the print head 204 by a motion controller 210, and/or moving the build platform 202 using a stage motion controller 218. Either, or both, of the print head 204 and the stage 218 can be moved in multiple directions, depending on the motion control system 210, 218, and as indicated by the movement arrows 212. The product to be created by the system 200 is produced using a motion control computer language, with an example being the widely used numerical control programming language G-Code, to issue computer generated instructions to the print head movement control 210 or the stage motion control 218. Optionally, the computer generated instructions can be used to control the dispensing system 220, but this is not required if another method is used for dispensing controlled. The computer print head controller 210 and/or the substrate movement controller 218 uses the prescribed C-code to dictate the motion of the print head 204 relative to the stage 202 during the printing. If applicable, the dispensing controller 220 is used to deliver the feedstock supply 206 through the print head 204. The dispensing control 220 is commonly done using pressurized gas, or by mechanical displacement of a plunger, to enable a prescribed flow of the feedstock from the print head 204. The motion and dispensing control is repeated as a series of at least two layers to yield a 3D part 214 to be created by the system 200.

Initially a 3D model of the desired product is designed by any suitable method, e.g., by bit mapping or by computer aided design (CAD) software at a PC/controller. The CAD model of the desired product is electronically sliced into series of 2-dimensional data files, i.e. 2D layers, each defining a planar cross section through the model of the desired product. In addition to the producing a series of layers, the motion of the system during the printing of a layer must also be prescribed by the computer. This is, for example, to ensure that the path never intersects within a layer. Another example would be to print layers with different filament orientations during the print. The instructions for motion control can be achieved by different software, with the most common being the widely used numerical control programming language G-code. If applicable, instructions for the dispensing control 220 of the material from the print head 204 are included in the computer generated instructions 208. The data files for each layer are stored in a computer and provide a digital image of the final product.

The digital images are used in the additive manufacturing system 200 to produce the final product. Multiple layers of material are produced in a layer by layer process to produce the final product. The first print layer is deposited directly onto the substrate, and all subsequent layers are deposited onto, or into, the previous layer of the part. The computer generated instructions 208 of the first layer are used to produce the first layer of the desired product. Once the first layer is completed production of the second layer of the product is started. A second layer is applied on top of the completed first layer. Extruded material in the form of a print stream 216 is deposited on the first layer by print head 204 to produce the second layer. This procedure is continued by repeating the steps and building the final product in a layer by layer process. The final product is a scaffold 214 that will be described in greater detail in connection with FIGS. 4A through 4C.

Figure 3:
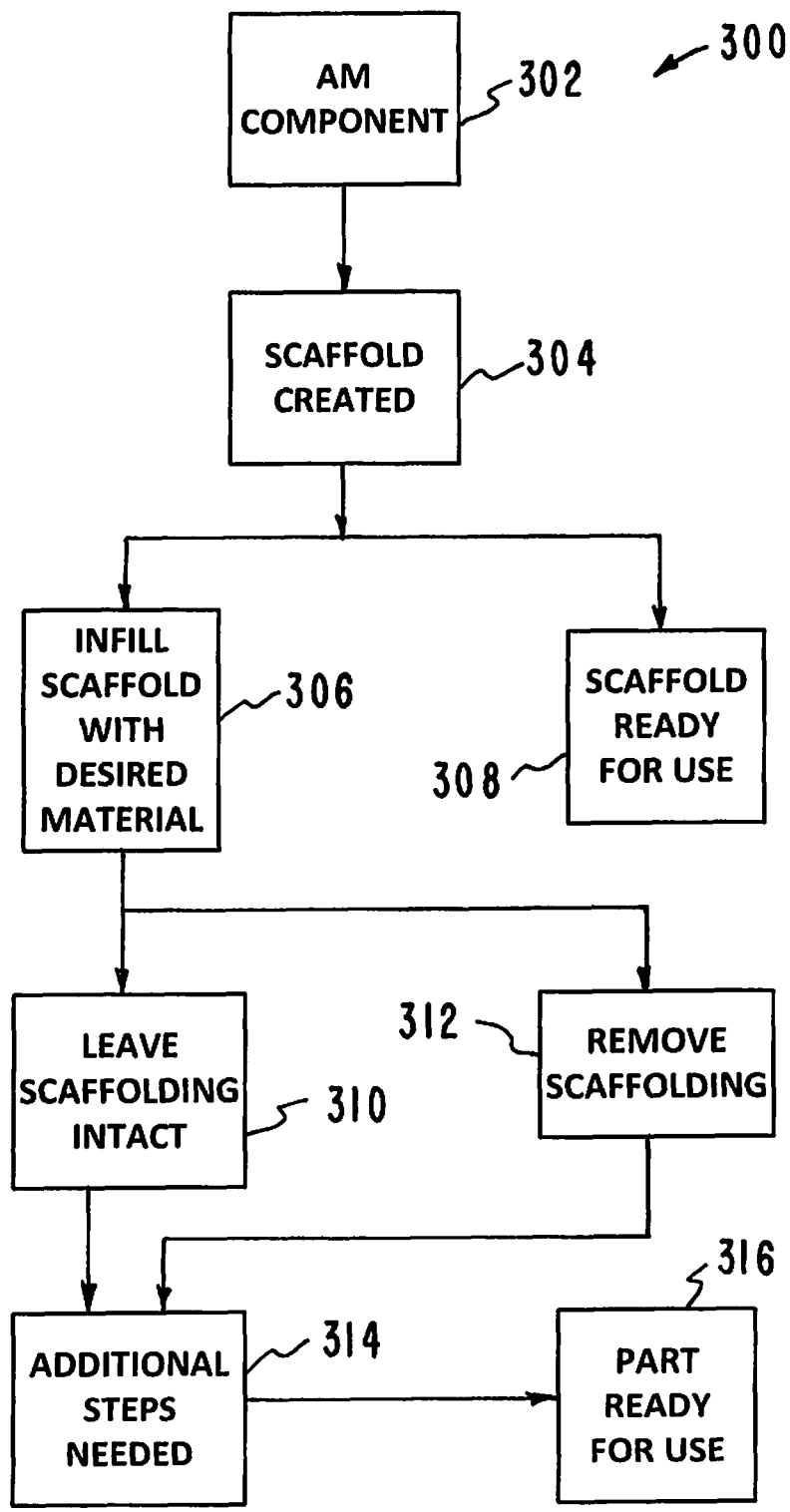
FIG. 3 is a flow chart illustrating the inventors' apparatus, systems, and methods that combine an additively manufactured part with an infill to provide a customized energetic system.

Referring now to FIG. 3, a flow chart illustrates an embodiment of the inventors' apparatus, systems, and methods that combine an additively manufactured part with an infill process to provide a customized energetic or reactive system. The flow chart is designated generally by the reference numeral 300. The flow chart 300 includes various step and those steps are identified and described below.

AM component 302.
Scaffold created 304.
Scaffold infilled with desired material 306.
Scaffold ready for use 308.
Leave scaffold intact 310.
Remove scaffold 312.
Additional steps 314.
Part ready for use 316.

The first two steps of the embodiment 300 of the inventors' apparatus, systems, and methods are (1) AM component 302 and (2) scaffold created 304. These two steps are further described as (1) using an additive manufacturing system 302 and (2) producing an additively manufactured scaffold 304. The step of using an additive manufacturing system 302 can be those illustrated in FIGS. 1 and 2 or other additive manufacturing steps to produce a scaffold. The scaffold 304 can be the scaffold illustrated in FIGS. 4A through 4C or other scaffolds.

After the step 304 of creating the scaffold, a decision is made between step 306 and 308. In the step 308 the scaffold is ready for use and can provide a customized energetic or reactive system. If step 308 is used, the air is considered as the second material in this multi-material part. In the step 306 the scaffold is infilled with a desired material.

After the step of scaffold infilled with desired material 306, the steps 310 and 312 can be selected. In step 310 the scaffold is left intact. In step 312 the scaffold is removed.

After the step 310 and 312, if the part needs additional steps they will be done at step 314, and the part will be ready for use at 316. It is to be understood that any number of processing steps may be repeated in different embodiments until the part is completed.

A scaffold 304 is used in at least one step to provide a customized energetic or reactive system in example 300. The apparatus, systems, and methods utilize at least two separate components in the processing of the final product, and with at least one step being the additive manufacturing step. The first component in the process 300 is an additively manufactured part and the second component is a component that is combined with the first additively manufactured part. Additive manufacturing is used to print a part of the system. In this example, at least one second manufacturing step is included to add or remove material to the additively manufactured component (i.e. melt infiltration, casting, deposition, 3D printing, chemical/thermal etching etc.) The result is a final energetic part comprised of at least two materials, air inclusive.

Figure 4A:
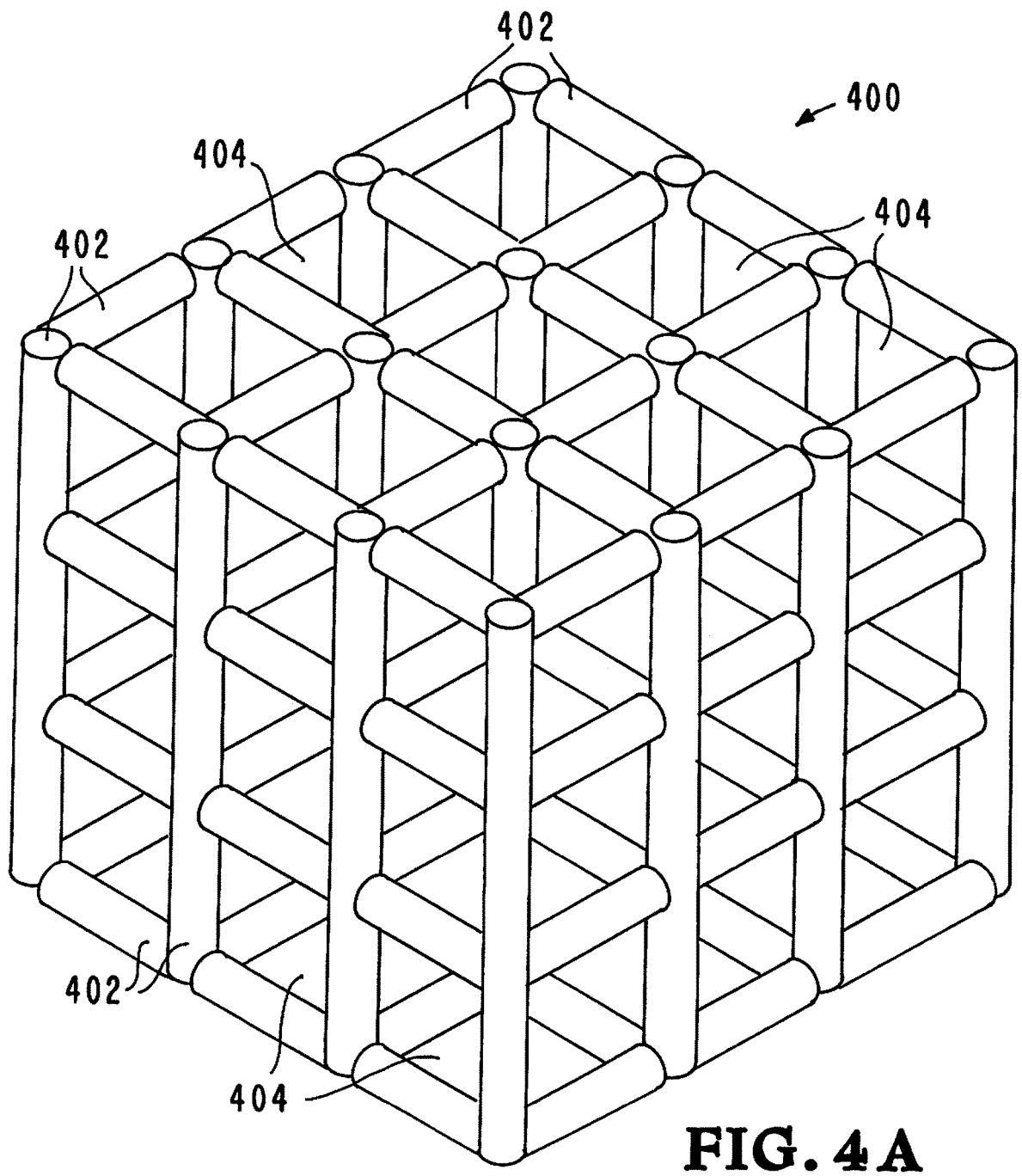
FIG. 4A shows a scaffold produced by the inventors' additive manufacturing system for creating the first manufactured part.

Referring now to FIG. 4A, a scaffold 400 produced by the inventors' additive manufacturing system is illustrated. The scaffold 400 includes a matrix 402 with open areas 404 within the matrix 402. An infill step renders the system energetic (i.e. propellant, pyrotechnic, explosive, reactive). The matrix 402 can be made of one of the indispensable components of the multi-material energetic part or the matrix 402 can be made of a non-energetic support material.

Figure 4B:
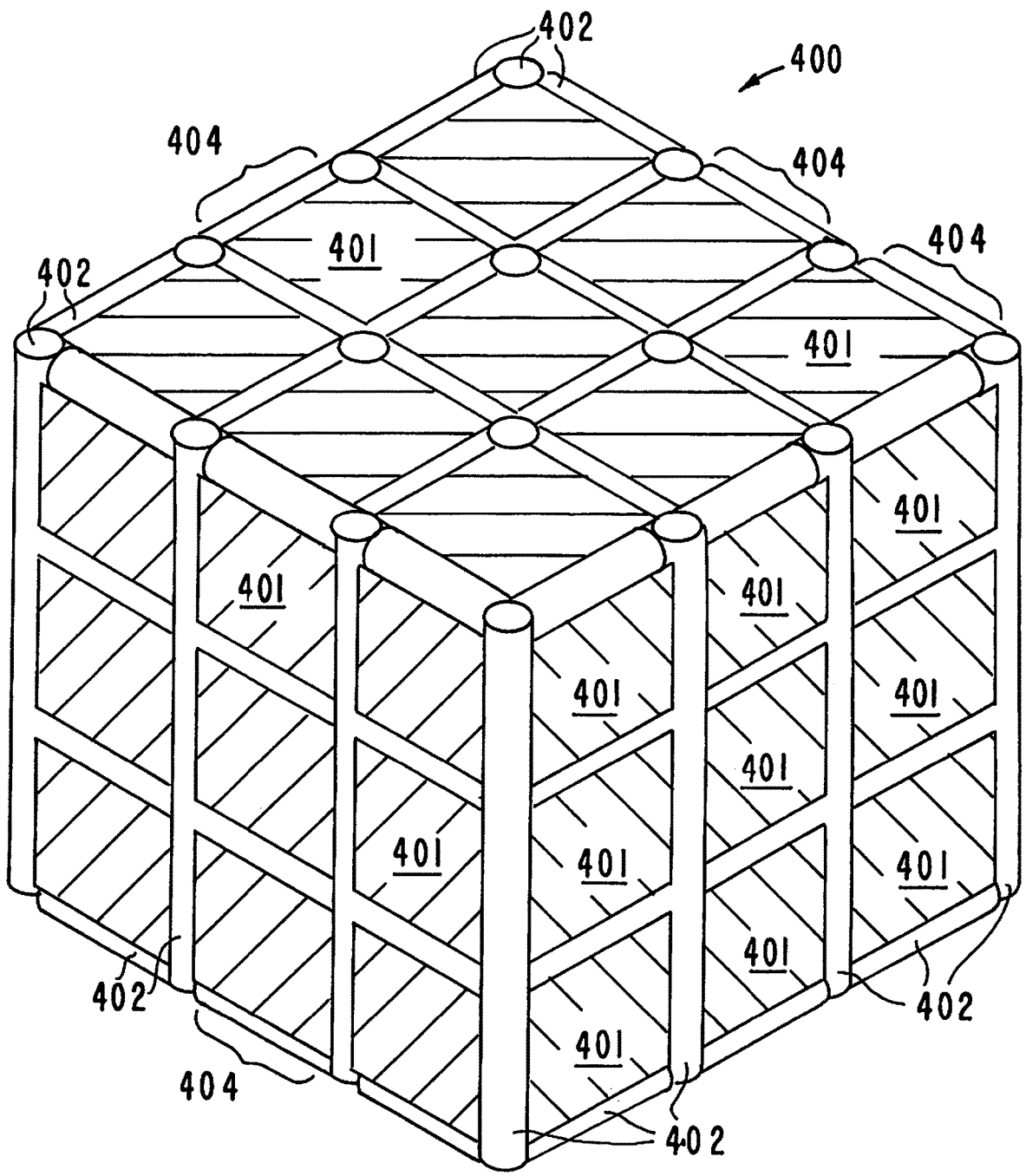
FIG. 4B shows a scaffold that can be provided with an infill to produce a customized energetic system.

Referring now to FIG. 4B, the scaffold 400 produced by the inventors' additive manufacturing system having a matrix 402 with open areas 404 within the matrix 402 is shown with an infill material 401 in the open areas 404 to provide the customized energetic or reactive system. An infill step fills the open areas 404 with infill material 401. The matrix 402 is made of one indispensable component of the multi-material energetic part and the infill material 401 is made of the second indispensable component of the multi-material energetic part. The infill material 401 renders the system energetic (i.e. propellant, pyrotechnic, explosive, reactive).

Figure 4C:
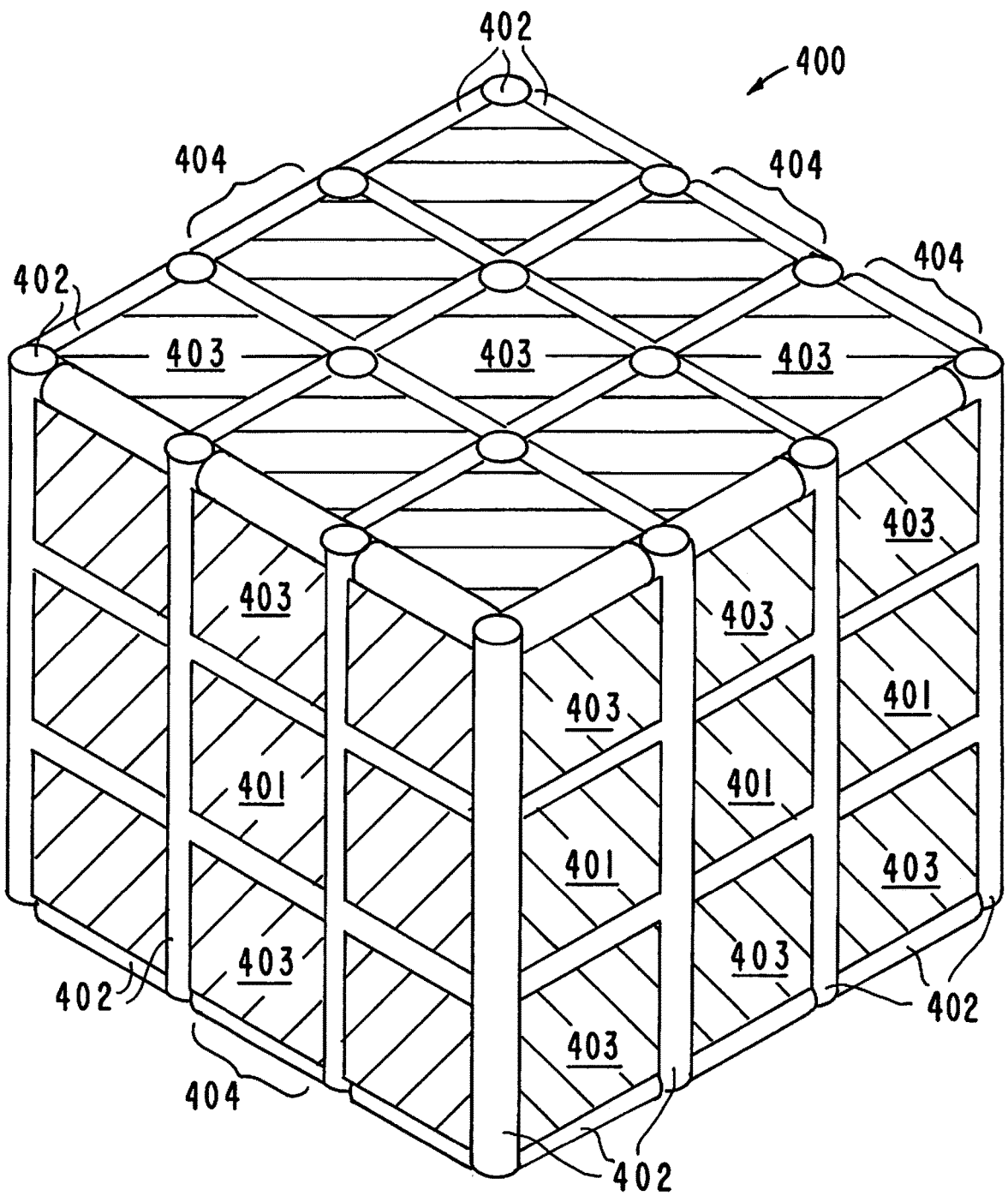
FIG. 4C shows a scaffold that can be provided with infills to produce a customized energetic system.

Referring now to FIG. 4C, the scaffold 400 produced by the inventors' additive manufacturing system having a matrix 402 with open areas 404 within the matrix 402 is shown with infill materials 401 and 403 in the open areas 404 to provide the customized energetic or reactive system. Infill steps fill the open areas 404 with infill materials 401 and 403. The matrix 402 is made of a support material. The infill material 401 is one indispensable component of the multi-material energetic part and the infill material 403 is made of the second indispensable component of the multi-material energetic part. The infill materials 401 and 403 render the system energetic (i.e. propellant, pyrotechnic, explosive, reactive).

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of producing an energetic system, comprising the steps of:
   providing a support material comprising fuel constituents;
   providing thermite explosive constituents;
   providing an additive manufacturing system, wherein said additive manufacturing system comprises:
   a print head configured to extrude a print stream of said support material,
   a motion controller configured to move said print head,
   a build platform, and/or
   a build platform motion controller configured to move said build platform;
   printing a matrix with a multiplicity of open areas with said additive manufacturing system, wherein said matrix is made from said support material comprising said fuel constituents extruded from said print head; and
   filling said multiplicity of open areas with an infill material to produce said energetic system, wherein said infill material comprises said thermite explosive constituents.

* * * * *